United States Patent [19]
De Cesare

[11] Patent Number: 4,845,398
[45] Date of Patent: Jul. 4, 1989

[54] ARMATURE STATOR CONFIGURATION FOR COMPOUND INTERACTION/INDUCTION ELECTRIC ROTATING MACHINE

[76] Inventor: Dominic V. De Cesare, 223 Center St., Elizabeth, N.J. 07202

[21] Appl. No.: 173,282

[22] Filed: Mar. 25, 1988

[51] Int. Cl.[4] .............................................. H02K 1/22
[52] U.S. Cl. ................................... 310/261; 310/154; 310/46
[58] Field of Search ............... 310/154, 254, 259, 198, 310/208, 261, DIG. 4

[56] References Cited

U.S. PATENT DOCUMENTS

| | | | |
|---|---|---|---|
| 3,558,947 | 1/1971 | Burr | 310/154 |
| 4,114,057 | 9/1978 | Esters | 310/46 |
| 4,441,043 | 4/1984 | De Cesare | 310/46 |
| 4,481,437 | 11/1984 | Parker | 310/191 |
| 4,574,214 | 3/1986 | Fujisalci | 310/154 |
| 4,683,388 | 7/1987 | De Cesare | 310/46 |

Primary Examiner—William M. Shoop, Jr.
Assistant Examiner—Marc S. Hoff
Attorney, Agent, or Firm—Lilling & Greenspan

[57] ABSTRACT

A dynamoelectric machine includes a frame, a shaft rotatably mounted on the frame and a cylindrical rotor mounted on the shaft. The rotor is provided with rotor coil winding grooves parallel to the shaft. A distributed armature winding is received within the grooves and create a build-up of windings which gradually increased dimensions in the region of the shaft, the build-up defining a conical convex surface. Permanent magnets are arranged proximate to the overlapping windings at the axial ends to produce a closed cylindrically shaped magnet to maximize the interaction between the magnets and the rotor.

10 Claims, 2 Drawing Sheets

ARMATURE STATOR CONFIGURATION FOR COMPOUND INTERACTION/INDUCTION ELECTRIC ROTATING MACHINE

CROSS-REFERENCE TO RELATED APPLICATION

The subject matter of this application has been described in Disclosure Document No. 182,663, which was filed in the U.S. Pat. and Trademark Office on Dec. 11, 1987.

BACKGROUND OF THE INVENTION

1. Field of the Invention

The present invention generally relates to dynamo-electric machines capable of operating in a generator mode or in a motor mode and, more specifically, to an increased sufficiency compound interaction AC and/or DC dynamoelectric machines which are simple in construction, and easy and inexpensive to manufacture.

2. Description of the Prior Art

Most armatures have distributed windings, i.e., windings which are spread over a number of slots around the periphery of a rotor or armature of the machine. In most conventional designs the machines are of a radial magnetic gap type so that electrical currents applied to the windings of the rotor or stator, or to the windings of both, generates electromagnetic fields in the rotor or in the stator, as the case may be. The torque or the EMF induced in the machine results from the interaction between the magnetic field in the radial magnetic gap and the generally parallel axial winding portions of the armature coils disposed in the axial grooves or slots of the armature. However, the back and front connections which are those portions of the windings which connect substantially diametrically opposing axial wire portions situated in the grooves have not been utilized in order to enhance the efficiency of the machine. Such front and back connections, which are substantially normal to the axis of the machine, rotate with the armature but have not been used to increase the torque of the machine, in the case of a motor, or to increase the power output, in the case of a generator. Specially designed special purpose dynamo-electric machines have been proposed in order to increase the efficiency and power output for given weight and size of the machine. One approach has been to use axial air gap type machines such as the brushless axial air gap inductor-type dynamoelectric machine disclosed in U.S. Pat. No. 3,467,844. The machine disclosed in the aforementioned patent uses plural variable reluctance rotors and a toroidal coil stator therebetween. However, the machine does not make use of a radial air gap. Accordingly, the machine requires a special construction which doe not make use of conventional distributed armature-type windings.

In an effort to provide electric machines which are inexpensive and small in size, there has also been developed disc-type rotors in machines defining axial air gaps. One example of such a machine is disclosed in U.S. Pat. No. 3,558,947. In that patent, a D.C. motor is described which includes a disc armature and a permanent magnet stator providing an axial air gap. Such machines, which use axial air gaps and generally flat armatures are sometimes referred to as having a pancake coil. Such pancake coils or rotors contain all of the armature turns in a generally flat plane which is normal to the shaft or axis of the machine. There is, accordingly, no axial air gap as there is in conventional cylindrical rotor distributed armature winding machines. In some instances, instead of making use of a winding on a pancake-type rotor, a flat substrate is provided on which various winding patterns are printed. Such winding patterns may be etched, plated, printed or pressure bonded on such thin disc-armature of insulating material. However, because of the difficulties which have been experienced with such thin disc-armatures, primarily because of the flexibility of the discs on which the conductors are placed, an electric machine has been disclosed in U.S. Pat. No. 3,487,246 which applies such conductive pattern on a conical surface of an insulating member. The purpose of making the armature conical is to provide a more rigid structure than the flat disc armature structures. Such flat substrate armature machines, however, whether flat or conical, cannot provide the mechanical or electrical power output as is possible with conventional cylindrical rotor machines.

U.S. Pat. No. 4,143,288 discloses a coreless motor which includes a rotor having a plurality of coils constituting a pancake coil. The motor disclosed in this patent is a special purpose motor which is capable of being attached to electrical parts such as balance weights, servo-mechanisms, etc. However, this motor likewise lacks the conventional cylindrical rotor found in most dynamo-electric machines which is provided with a distributed armature winding. As with the other pancake-type armatures, the coreless motor disclosed in this patent does not have a radial air gap and, therefore, does not have the ability to compound the intereaction or induction in the machine both at the axial ends and the peripheral surface of the armature.

There has also been proposed a dynamoelectric machine which has plural stators. Such machines have been disclosed in U.S. Pat. Nos. 3,396,296; 3,426,224; 3,602,749; 3,729,642 and 4,114,057. These patents, all issued to the same patentee, were intended to combine advantages of using both the radial gap and axial gap in dynamoelectric machines. However, to do so, applicant disclosed a complicated structure making use of both inner and outer stators and a hollow cylindrical rotor. In these structures, a first stator is disclosed within the hollow cylindrical rotor and a second stator, also cylindrical in shape is disposed such as to surround the rotor. In this way, double radial air gaps are formed. It was also suggested that end stators may be used to form axial air gaps between the ends of the rotor and the magnetic field created by the end stators. These machines were described as having greater efficiency than conventional motors or generators as the result of the increased intereaction between the multitude of magnetic field and electromagnetic fields. However, the machines purposed in the last mentioned series of patents are unconventional in design and construction, do not have radial grooves and do not have front and back armature winding connections at the axial ends of the rotor as is present in the normal distributed armature winding arrangements. Instead, the windings are each would around a flat, relatively thin magnetic core.

Other special purpose dynamoelectric machines have been proposed for special appliations. Thus, for example, in U.S. Pat. No. 4,051,401, a spherical air gap motor is disclosed wherein the magnetic ring closing the stotor magnetic loop has a non-cylindrical shape. Such electric motors with spherical air gaps have found applications in pump drives, particularly for hermetically sealed chemical pumps.

The use of magnets at the axial ends of an armature is also known. See, for example, U.S. Pat. No. 4,237,394. However, the last mentioned patent utilizes the end magnets as part of a frequency generator where the magnets are used as part of a variable reluctance magnetic circuit to induce a signal of a desired frequency in a generation coil.

The prior art has not, however, utilized both perpheral and end stators in cylindrical rotor machines to simultaneously cooperate with both rotor axial and radial coil portions to enhance the efficiency of the machine and significantly improve its performance characteristics. By harnessing the additional torque, in the case of motor operation, or the additional electromagnetic inductive force, in the case of generator operation, significant improvements in efficiency can be obtained without compromising any constructional features and without the need to resort to unconventional, complicated or costly machine designs.

In order to improve upon the prior art designs, the inventor of the present application has disclosed a number of compound induction electric rotating machines in U.S. Pat. No. 4,683,388, issued on July 28, 1987 which was a continuation-in-part of U.S. Pat. No. 4,441,043, which was, in turn, a continuation-in-part of U.S. Pat. No. 4,581,554. While the prior designs have resulted in improved machine operation, the designs involved additional structural components and, equally importantly, did not take full advantage or optimize the inventive design. The prior design did not, therefore, fully benefit from the advantages of improved operating characteristics as well as facility and costs of manufacture.

In the previously issued U.S. Pat. Nos. 4,581,554; 4,441,043; and 4,683,388, the subject inventor disclosed a number of compound induction interaction electric rotating machines which utilized one or more separate primary or main stator magnets, as well as one or more secondary axially positioned magnets. However, the prior constructions involved more components and, therefore, required a larger number of steps in assembly. This resulted in increased cost of manufacture.

SUMMARY OF THE INVENTION

It is, accordingly, a primary object of the present invention to provide a stator configuration for a compound interaction induction electric rotating machine of the type generally disclosed in, for example, U.S. Pat. No. 4,683,388, which stator magnets are substantially closed cylindrically shaped magnets which house the rotor by almost fully enclosing same.

It is another object of the present invention to provide a stator construction of the type mentioned in the last object which is simple in construction, minimizes the number of magnetic members to be handled and, therefore, simplifies the assembly and manufacture of the machine, and thereby reduces its costs.

In order to achieve the above objects, as well as others which will become apparent hereafter, a dynamo-electric machine in accordance with the present invention comprises a frame, and a shaft rotatably mounted on said frame. A cylindrical rotor is provided which is mounted coaxially on said shaft defining two axial end surfaces each substantially in a plane normal to said shaft in a cylindrical circumferential surface coaxial with said shaft between said axial end surfaces. Said rotor is provided with a plurality of rotor coil winding grooves which are generally parallel to said shaft and substantially uniformly spaced from each other about said circumferential surface to define a predetermined number of magnetic poles. A distributed armature winding is provided which has axial portions parallel to said shaft and received within said rotor grooves and radial portions in the region of said end surfaces and extending between substantially diametrically opposite grooves with respect to said shaft. Said winding radial portions at each axial end surface of said rotor creating a build-up of overlapping windings which is minimum at said circumferential surface and gradually increases to a maximum in the region of said shaft. Said build-up generally defines a conical convex surface.

An important feature of the present invention is the provision of a magnetic field producing means of proximity to said rotor cylindrical circumferential surface and to said two axial end surfaces. Said magnetic field producing means comprises a substantially closed cylindrically shaped magnet which houses said rotor and includes main magnetic poles proximate to and substantially coextensive with the entire rotor cylindrical circumferential surface and end magnetic poles each proximate to and substantially coextensive with an entire one of said rotor axial end surfaces. In this manner, magnetic fields formed by said main magnetic poles link with and are coupled to said armature winding axial portions and magnetic fields formed by said end magnetic poles linked with and are coupled to said armature winding radial portions to maximize the interaction between said magnets and said rotor.

In accordance with the presently preferred embodiments, the substantially closed cylindrically shaped magnet comprises two semi-cylindrical sections which are symmetrically spaced with respect to a longitudinal plane passing through the shaft to form a gap, each of the semi-cylindrical sections being of unitary construction or being formed of two segments which are split at an intermediate point of the machine but abut against each other in the assembled machine.

BRIEF DESCRIPTION OF THE DRAWINGS

The objects and advantages of the present invention will become apparent to those skilled in the art when the following description of several illustrative embodiments of the invention is read in conjunction with the accompanying drawings, in which.

DESCRIPTION OF A PREFERRED EMBODIMENT

Figure 1:
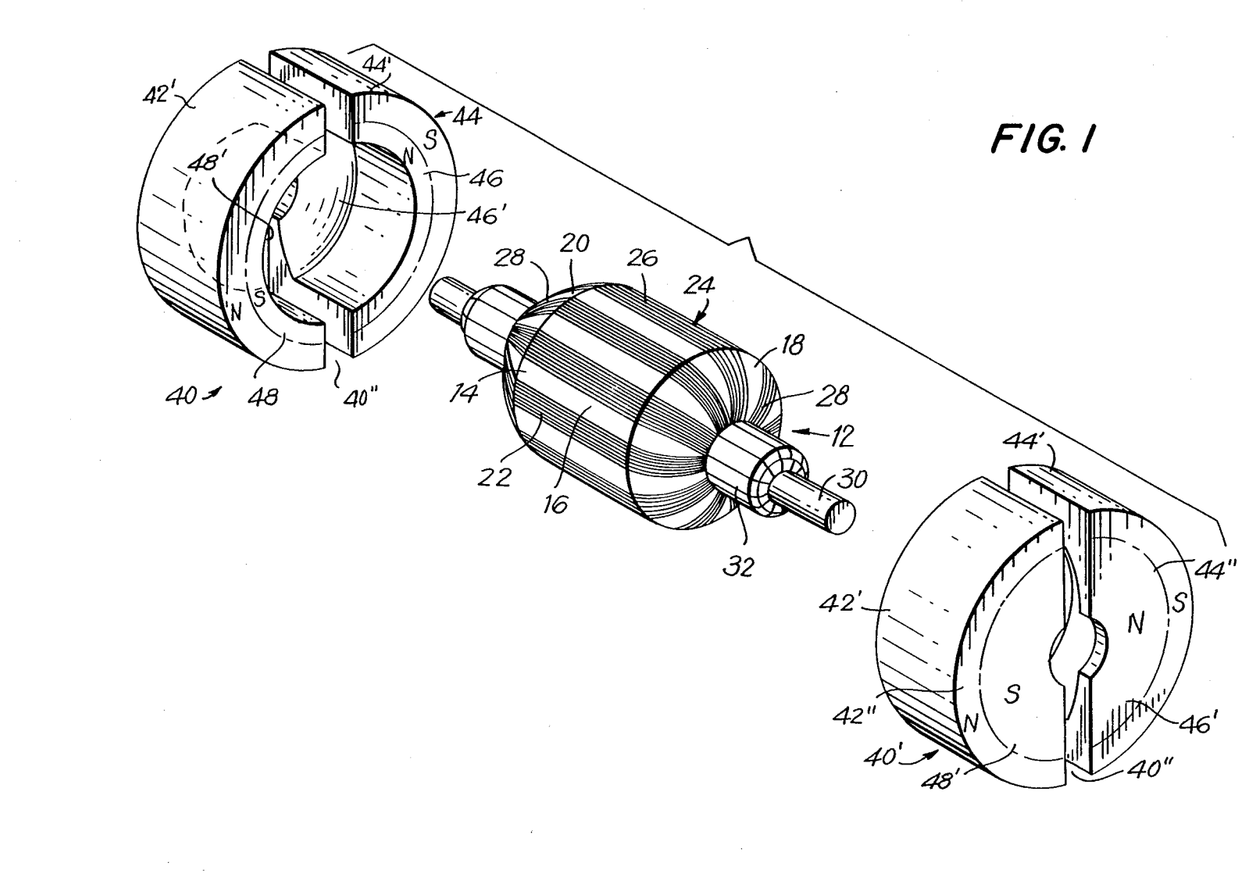
FIG. 1 is an exploded view, in perspective, of an electric machine in accordance with the present invention, showing the stator magnets in the form of four segments or sections of permanent magnets which are configured and dimensioned to receive the rotor in the assembled condition with little clearance to permit unimpeded rotation of the rotor, while providing optimum coupling between the poles formed on the inner surfaces of the permanent magnets and the radial and axial winding portions of the distributed winding.

Referring now to the figures, in which identical or similar parts are designated by the same reference numerals throughout, and first referring to FIG. 1, an exploded view, in perspective, is shown of an electric machine which is generally designated by the reference numeral 10.

The machine 10 includes a drum type rotor 12 which includes an armature body 14 which defines a main or central cylindrical circumferential surface 16, and axial end surfaces 18, 20 at each axial end of the circumferential surface 16. The rotor 12 is mounted on a shaft 30 for rotation about the machine axis 30'.

Formed in the cylindrical circumferential surface 16 are a plurality of spaced substantially parallel winding receiving grooves or slots 22, formed in the conventional manner. A distributed armature winding 24 is wound on the rotor 12 which includes those portions of the windings which are received within the grooves or slots 22. These portions of the windings will be referred to as the axial winding portions, while the extensions of such axial portions which extend generally radially inwardly from the grooves or slots 22 will be referred to as the radial winding portions. The radial portions of the winding may extend between diametrically opposite grooves of the rotor or may extend from a groove to a commutator 32, which is used in a conventional manner to provide successive connections between a stationary point on the stator and the moving turns of the rotor winding.

As is well known, the winding radial portions at each axial end surface of the rotor typically create a build-up of overlapping windings which is minimum at the circumferential surface 16 and gradually increases to a maximum in the region of the shaft 30, said build-up generally defining a conical convex surface.

An important feature of the present invention is the provision of magnetic field producing means in the nature of combined periphery and side stator magnets 40, 40' which are in proximity to the rotor cylindrical circumferential surface 16 and to the two axial end surfaces 18, 20. The magnetic field producing members comprise a substantially closed cylindrically shaped magnet, as suggested in FIG. 1, which houses the rotor 12 and includes main magnetic poles 46, 48 proximate to and substantially coextensive with the entire rotor cylindrical circumferential surface 16, and end magnetic poles 46', 48' each proximate to and substantially coextensive with an entire one of the rotor axial end surfaces 18, 20. In this manner, magnetic fields formed by the main magnetic poles 46, 48 link with and are coupled to the armature winding axial portions 26 and magnetic fields formed by the end magnetic poles 46', 48' link with and are coupled to the armature winding radial portions 28 to maximize the interaction between the magnets and the rotor.

In accordance with one presently preferred embodiment, the combined periphery and side stator magnets are formed of two semi-cylindrical sections which are symmetrically spaced with respect to a longitudinal plane passing through the shaft to form a gap 40". The inside surface of one of the semi-cylindrical sections is disposed in opposition to approximately one-half of the winding radial and axial portions and is magnetized with one polarity, e.g. a "North" magnetic pole 46 on one side of the air gap 40". The inside surface of the other of the semi-cylindrical sections 44 is disposed in opposition to approximately the other half of the winding radial and axial portions and is magnetized with another polarity e.g., "South" pole on the other side of the air gap 40". As should be evident, the main and end magnetic poles (e.g. poles 48 and 48'; or poles 46 and 46') of each semi-cylindrical section are magnetized with the same polarity.

A feature of the present invention is the configuration of the stator magnets, namely, a configuration wherein the internal surface of each semi-cylindrical section is shaped to conform with the shape of the rotor as well as with the distributed armature winding. In this manner, the spacing between the magnets and the winding axial and radial portions may be minimized and coupling maximized. Thus, in the embodiment described, the inside surface of each end magnet has a generally conical concave surface which substantially conforms to said conical convex surface defined by the build-up of winding radial portions to form a clearance therebetween to permit unimpeded rotation of the rotor 12.

In the specific embodiment shown in FIG. 1, each longitudinal semi-cylindrical section 42, 44 is split at a point intermediate the end magnets 46, 48, to form two segments along the longitudinal or axial direction of the machine, to facilitate assembly. However, in the assembled condition, the two segments of each semi-cylindrical section (on the same side of the gap 40"), abut against each other in the assembled condition of the machine.

While each longitudinal semi-cylindrical section may be split in any one of a different number of ways, in the presently preferred embodiment the split is formed by a transverse plane substantially normal to the shaft.

Figure 2:
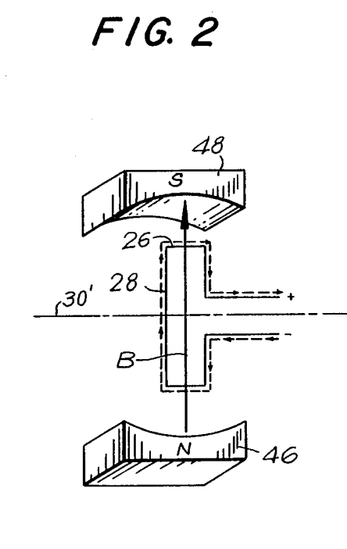
FIG. 2 is a diagrammatic representation of a single turn of a distributed winding, showing the manner in which the magnetic field extending between the two diametrically opposite poles interact with the axial portions of the turn or coil.
Figures 2, 3:
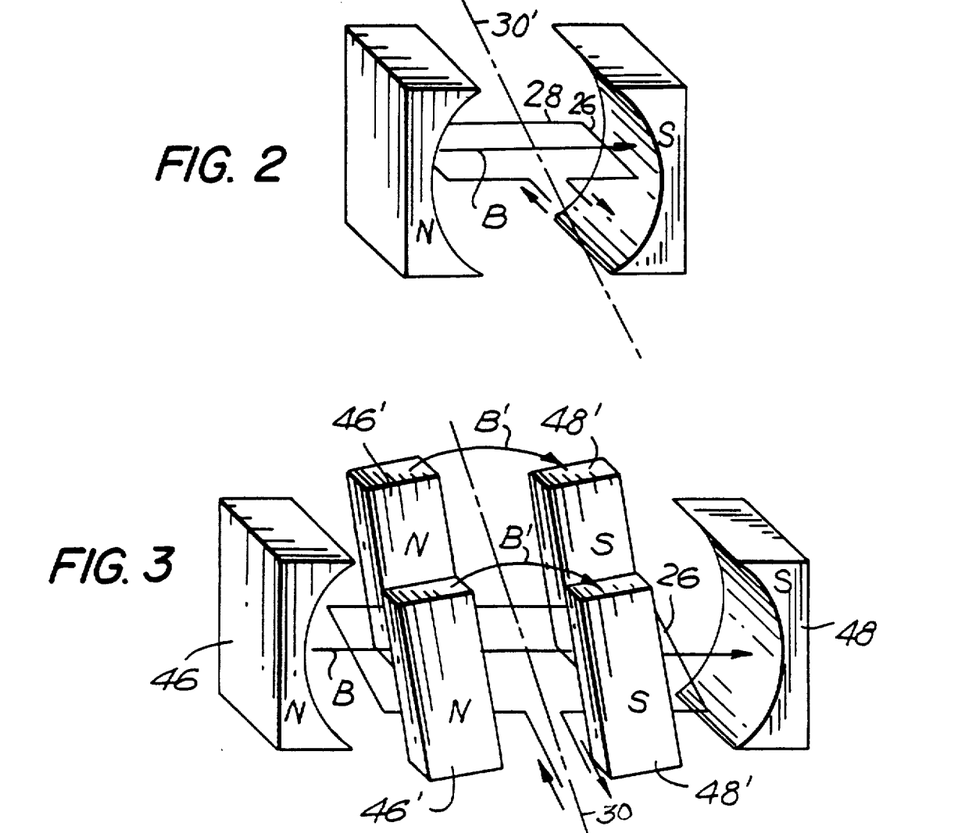
FIG. 3 is similar to FIG. 2, but showing two additional pole magnets, one on each side of the turn or coil of the distributed winding to provide additional lateral coupling by the additional axial fields created by the additional end magnets.
Figure 3:
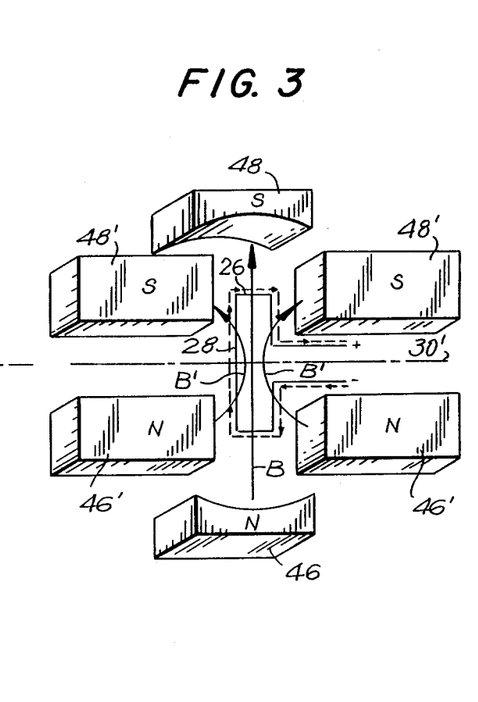
Figure 4:
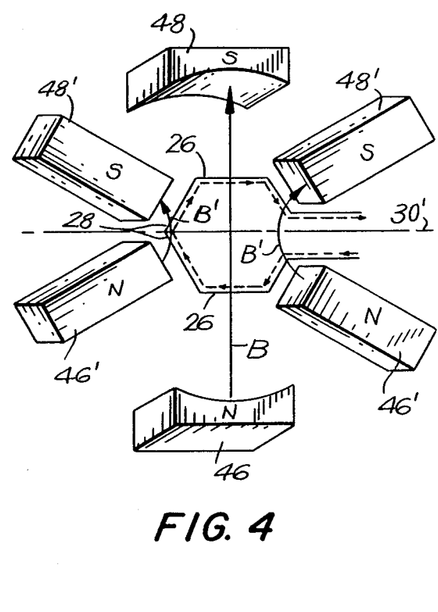
FIG. 4 is similar to FIG. 3, but showing the end or axial magnets arranged to more closely simulate the magnetic pole configurations shown in FIG. 1, and the lateral or axial end windings arranged to more closely resemble the orientations of these windings in the built-up portion of the distributed winding in FIG. 1.

An explanation for the improvement in motor operation is explained by the sequence of FIGS. 2–4. In FIG. 2, only the two main stator magnets 46, 48 are shown, wherein a single substantially parallel magnetic field B extends from the North pole to the South pole as shown. One turn or loop of the distributed winding is shown, having axial winding portions 26, generally normal to the field, and radial winding portions 28 which are generally parallel to the field. As is well known, only the axial winding portions or those which have a normal component to the field B will be effective in coupling with and interacting with the field. In FIG. 2, therefore, the radial winding portions 28 have little or no interaction whatsoever and do not come into play.

In FIG. 3, the same arrangement is shown as in FIG. 2, except that two additional magnets 46' and 48' are shown positioned symmetrically arranged with relation to the axis of rotation of the machine. The additional or auxiliary fields produced by these axial magnets are generally designated by B'. While the axial winding portions 26 still interact with the main field B as shown in FIG. 2, the auxiliary or axial fields B' are shown to intercept or link with the radial winding portions 28, to thereby enhance the total degree of coupling and interaction with the winding or stator coil. The effect is additive, so that the overall result is the sum of the effects produced in both the axial as well as the radial winding portions 26, 28, respectively.

In FIG. 4, the magnets 46' and 48' shown in FIG. 3 have merely been angled or rotated somewhat to more closely simulate the orientations of the magnets 46' and 48' in FIG. 1. Similarly, the radial windings 28 in FIG. 4 have been drawn in a manner which more closely simulates the build-up of such radial winding portions at each axial end of the rotor. It will be seen, therefore, that preferably the orientations of the auxiliary or end magnets are selected to conform, to the extent possible, with the orientations of the radial winding portions 28. By conforming the surfaces of the end magnets with the resulting surfaces defined by the build-up of wire at each axial end, maximum effective coupling will be produced, as suggested by the generally perpendicular to the magnetic field lines B' and the radial winding portions 28. As is well known to those skilled in the art, maximum interaction results when winding portions or coils intercept or move in a magnetic field in a direction normal or perpendicular to that field. As with the prior figures, the axial winding portions 26 still continue to primarily interact with and couple with the primary field B.

While only one illustrative embodiment of the invention has been described in detail, it should be obvious that there are numerous variations and modifications within the scope of the invention. The invention is more particularly defined in the appended claims.

What is claimed is:

1. A dynamoelectric machine comprising;
   a frame;
   a shaft rotatably mounted on said frame; a cylindrical rotor mounted coaxially on said shaft defining two axial end surfaces each substantially in a plane normal to said shaft and a cylindrical circumferential surface coaxial with said shaft between said axial end surfaces, said rotor being provided with a plurality of rotor coil winding grooves which are generally parallel to said shaft and substantially uniformly spaced from each other about said circumferential surface to define a predetermined number of magnetic poles;
   a distributed armature winding having axial portions parallel to said shaft and received within said rotor grooves and radial portions in the region of said end surfaces and extending between substantially diametrically opposite grooves with respect to said shaft, said winding radial portions at each axial end surface of said rotor creating a build-up of overlapping windings which is minimum at said circumferential surface and gradually increases to a maximum in the region of said shaft, said build-up generally defining a conical convex surface; and magnetic field producing means in proximity to said rotor cylindrical circumferential surface and to said two axial end surfaces, said magnetic field producing means comprising a substantially closed cylindrically shaped magnet which houses said rotor and includes main magnetic poles proximate to and substantially coextensive with the entire rotor cylindrical circumferential surface and end magnetic poles each proximate to and substantially coextensive with an entire one of said rotor axial end surfaces, whereby magnetic fields formed by said main magnetic poles link with and are coupled to said armature winding axial portions and magnetic fields formed by said end magnetic poles link with and are coupled to said armature winding radial portions to maximize the interaction between said magnets and said rotor.

2. A dynamoelectric machine as comprised in claim 1, wherein said substantially closed cylindrically shaped magnet comprises two semi-cylindrical sections symmetrically spaced with respect to a longitudinal plane passing through said shaft to form a gap, the inside surface of one of said semi-cylindrical sections being disposed in opposition to approximately one-half of said winding radial and axial portions and being magnetized with one polarity on one side of said air gap and the inside surface of the other of said semi-cylindrical sections being disposed in opposition to approximately the other half of said winding radial and axial portions and being magnetized with another polarity on the other side of said air gap.

3. A dynamoelectric machine as comprised in claim 2, wherein said main and end magnetic poles of each semi-cylindrical section are magnetized with the same polarity.

4. A dynamoelectric machine as comprised in claim 2, wherein the internal surface of each semi-cylindrical section is shaped to conform with the shape of said rotor as wound with said distributed armature winding, whereby the spacing between said magnets and said winding axial and radial portions may be minimized and coupling maximized.

5. A dynamoelectric machine as comprised in claim 4, wherein the inside surface of each end magnet has a generally conical concave surface which substantially conforms to said conical convex surface defined by the build-up of winding radial portion to form a clearance therebetween thereby permitting unimpeded rotation of said rotor.

6. A dynamoelectric machine as comprised in claim 2, whereby each longitudinal semi-cylindrical section is split at a point intermediate said end magnets to form two segments to facilitate assembly.

7. A dynamoelectric machine as comprises in claim 6, wherein the two segments of each semi-cylindrical section abut against each other in the assembled condition of the machine.

8. A dynamoelectric machine as comprised in claim 6, wherein each longitudinal semi-cylindrical section is split substantially at the axial center of the machine.

9. A dynamoelectric machine as comprised in claim 8, wherein the split is made by a transverse plane substantially normal to said shaft.

10. A dynamoelectric machine as comprised in claim 1, wherein said magnets are permanent magnets.

* * * * *

UNITED STATES PATENT AND TRADEMARK OFFICE
CERTIFICATE OF CORRECTION

PATENT NO. : 4,845,398

DATED : July 4, 1989

INVENTOR(S) : Dominic DeCesare

Page 1 of 3

It is certified that error appears in the above-identified patent and that said Letters Patent is hereby corrected as shown below:

The sheet of drawing consisting of figures 2-4 should be deleted to be replaced with figures 2-4 as shown on the attached pages.

Signed and Sealed this

Third Day of July, 1990

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,845,398

DATED : July 4, 1989

INVENTOR(S) : Dominic DeCesare

It is certified that error appears in the above-identified patent and that said Letters Patent is hereby corrected as shown below:

FIG. 4

UNITED STATES PATENT AND TRADEMARK OFFICE
CERTIFICATE OF CORRECTION

PATENT NO. : 4,845,398

DATED : July 4, 1989

INVENTOR(S) : Dominic DeCesare

It is certified that error appears in the above-identified patent and that said Letters Patent is hereby corrected as shown below:

FIG. 2

FIG. 3

UNITED STATES PATENT AND TRADEMARK OFFICE
CERTIFICATE OF CORRECTION

PATENT NO. : 4,845,398                                    Page 1 of 3

DATED       : July 4, 1989

INVENTOR(S) : Dominic V. De Cesare

It is certified that error appears in the above-identified patent and that said Letters Patent is hereby corrected as shown below:

The title page should be deleted to appear as per attached sheet.

Fig. 1, should be deleted to appear as shown on attached sheet.

Signed and Sealed this

Ninth Day of October, 1990

*Attest:*

HARRY F. MANBECK, JR.

*Attesting Officer*    *Commissioner of Patents and Trademarks*

United States Patent [19]

De Cesare

[11] Patent Number: 4,845,398

[45] Date of Patent: Jul. 4, 1989

[54] ARMATURE STATOR CONFIGURATION FOR COMPOUND INTERACTION/INDUCTION ELECTRIC ROTATING MACHINE

[76] Inventor: Dominic V. De Cesare, 223 Center St., Elizabeth, N.J. 07202

[21] Appl. No.: 173,282

[22] Filed: Mar. 25, 1988

[51] Int. Cl.⁴ ............................................. H02K 1/22
[52] U.S. Cl. .................................. 310/261; 310/154; 310/46
[58] Field of Search ............. 310/154, 254, 259, 198, 310/208, 261, DIG. 4

[56] References Cited

U.S. PATENT DOCUMENTS

| 3,558,947 | 1/1971 | Burr | 310/154 |
| 4,114,057 | 9/1978 | Esters | 310/46 |
| 4,441,043 | 4/1984 | De Cesare | 310/46 |
| 4,481,437 | 11/1984 | Parker | 310/191 |
| 4,574,214 | 3/1986 | Fujisalci | 310/154 |
| 4,683,388 | 7/1987 | De Cesare | 310/46 |

*Primary Examiner*—William M. Shoop, Jr.
*Assistant Examiner*—Marc S. Hoff
*Attorney, Agent, or Firm*—Lilling & Greenspan

[57] ABSTRACT

A dynamoelectric machine includes a frame, a shaft rotatably mounted on the frame and a cylindrical rotor mounted on the shaft. The rotor is provided with rotor coil winding grooves parallel to the shaft. A distributed armature winding is received within the grooves and create a build-up of windings which gradually increased dimensions in the region of the shaft, the build-up defining a conical convex surface. Permanent magnets are arranged proximate to the overlapping windings at the axial ends to produce a closed cylindrically shaped magnet to maximize the interaction between the magnets and the rotor.

10 Claims, 2 Drawing Sheets

UNITED STATES PATENT AND TRADEMARK OFFICE
CERTIFICATE OF CORRECTION

PATENT NO. : 4,845,398

DATED : July 4, 1989

INVENTOR(S) : Dominic DeCesare

Page 3 of 3

It is certified that error appears in the above-identified patent and that said Letters Patent is hereby corrected as shown below:

FIG. 1